US007662900B2

(12) United States Patent
Seidl et al.

(10) Patent No.: US 7,662,900 B2
(45) Date of Patent: Feb. 16, 2010

(54) METHOD FOR PRODUCING POLYISOBUTENE

(75) Inventors: Volker Seidl, Mannheim (DE); Carolin Nadine Duecker, Ludwigshafen (DE); Alexandra Wiedemann, Bobenheim (DE); Thomas Wettling, Limburgerhof (DE); Uwe Rachwalsky, Ludwigshafen (DE); Marco-Christian Volland, Neuhofen (DE); Martin Karches, Neustadt (DE); Franz Weber, Eppelheim (DE); Dieter Stuetzer, Dudenhofen (DE); Werner Bochnitschek, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 12/089,539

(22) PCT Filed: Oct. 10, 2006

(86) PCT No.: PCT/EP2006/067243

§ 371 (c)(1),
(2), (4) Date: Apr. 8, 2008

(87) PCT Pub. No.: WO2007/042516

PCT Pub. Date: Apr. 19, 2007

(65) Prior Publication Data

US 2008/0214763 A1  Sep. 4, 2008

(30) Foreign Application Priority Data

Oct. 11, 2005 (DE) ............... 10 2005 048 698
Sep. 15, 2006 (EP) ............... 06120781

(51) Int. Cl.
*C08F 10/10* (2006.01)
*C08F 2/34* (2006.01)
*C08F 4/14* (2006.01)

(52) U.S. Cl. ............... 526/348.7; 526/88; 526/237

(58) Field of Classification Search ............... 526/88, 526/237, 348.7
See application file for complete search history.

(56) References Cited

U.S. PATENT DOCUMENTS

| RE22,210 E | * | 10/1942 | De Simo et al. | ............... 526/74 |
| 2,395,079 A | * | 2/1946 | Sparks et al. | ............... 422/135 |
| 4,558,104 A | * | 12/1985 | Bronstert et al. | ............... 526/65 |
| 5,643,676 A | | 7/1997 | Dobashi et al. | |

FOREIGN PATENT DOCUMENTS

| EP | 0 025 530 | 3/1981 |
| EP | 025530 A2 * | 3/1981 |
| EP | 0 115 635 | 8/1984 |
| EP | 0 807 641 | 11/1997 |
| JP | 2002 220426 | 8/2002 |
| WO | 03/004540 | 1/2003 |

OTHER PUBLICATIONS

Wieland-Berghausen S., et al: "Comparison of Microencapsulation Techniques for the Water-Soluble Drugs Nitenpyram and Clomipramine HCl", Journal of Controlled Release, vol. 85, No. 1-3, pp. 35-43, XP004397763, 2002.

* cited by examiner

*Primary Examiner*—Roberto Rábago
(74) *Attorney, Agent, or Firm*—Oblon, Spivak, McClelland, Maier & Neustadt, L.L.P.

(57) ABSTRACT

The present invention relates to a process for preparing polyisobutene by polymerizing isobutene using an inert diluent and a halogen-containing Lewis acid as a catalyst, wherein the isobutene in the form of droplets is contacted with the Lewis acid in a polymerization apparatus.

30 Claims, 3 Drawing Sheets

METHOD FOR PRODUCING POLYISOBUTENE

Figure 1:
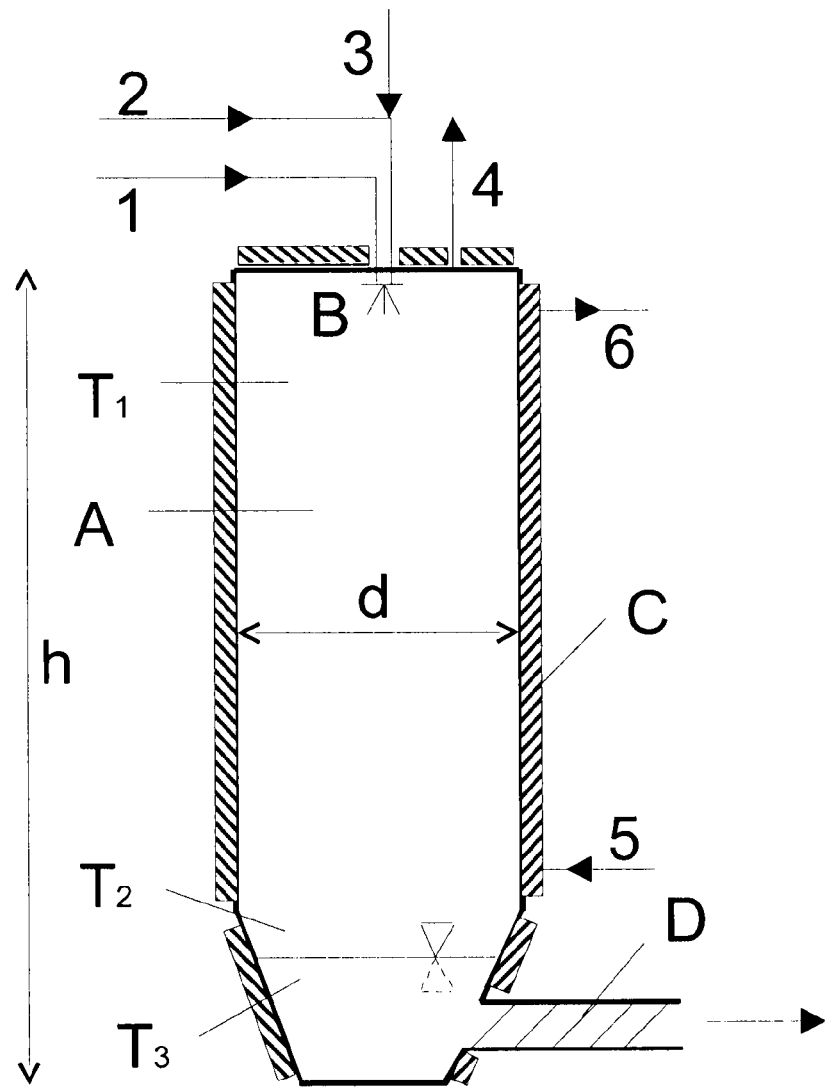

The present invention relates to a process for preparing polyisobutene, especially high molecular weight polyisobutene, by polymerizing isobutene using a halogen-containing Lewis acid as a catalyst.

The preparation of polyisobutene by polymerizing isobutene with Lewis acids such as boron trifluoride or aluminum trichloride as a catalyst has been known for some time. Depending on the reaction temperature, catalyst and purity of the isobutene used, low molecular weight, medium molecular weight or high molecular weight polyisobutene is obtained. An overview of processes for polyisobutene preparation can be found in Ullmann's Encyclopedia of Industrial Chemistry, 5th Edition, Vol. A21, 1992, 555-561.

Medium molecular weight polyisobutene is prepared typically in n-hexane as a solvent in a tubular or tube bundle reactor, especially in a circulation reactor, at a temperature of from −60° C. to −10° C. Frequently, boron trifluoride is used as a catalyst together with isopropanol as a cocatalyst. The heat of polymerization is removed via a heat exchanger, especially tube bundle heat exchanger. The number-average molar masses of the resulting product are between 30 000 and 100 000 g/mol. The polydispersity index D (quotient of the weight-average and of the number-average molecular weight $D=M_w/M_n$) of the product is typically in the range from 2 to 6.

Low molecular weight polyisobutene is prepared typically by a similar process, except that the reaction temperature is in the range from −50° C. to +40° C. The number-average molar masses $M_n$ are in the range from 500 to 5000 g/mol and the polydispersity index D is in the range from 1.5 to 2.5.

High molecular weight polyisobutene is typically prepared by $BF_3$-catalyzed polymerization of isobutene in ethene as a solvent. Typically, the polymerization is effected in a belt reactor, in which case isobutene and ethene are applied to a belt in jets closely adjacent to one another and contacted there with a solution of boron trifluoride in ethene at about −104° C. (BASF belt process). The heat of reaction is removed by the evaporating ethane.

The polymerization of isobutene is highly exothermic. In all processes, particular efforts have to be made to remove the heat of reaction. In the known processes, the heat removal cannot be controlled to the desired degree, so that the resulting products have high molecular polydispersity. Moreover, the polyisobutenes are very tacky at temperatures above the glass transition temperature, which leads to great difficulties in the discharge of the products from the reactor.

In the preparation of high molecular weight polyisobutene by means of belt processes, owing to the type of introduction, there is splashing of the reactants, which polymerize to completion on the reactor walls and the internals, so that the maintenance and cleaning complexity is high. An additional factor is that the high molecular weight polyisobutene is obtained here in large lumps and therefore has to be comminuted. This operation too is complicated in apparatus terms owing to the tackiness of polyisobutene. The comparatively long residence time of the reactants on the belt, the problematic heat removal and the difficult controllability of the reaction lead to an inhomogeneous product distribution. In addition, the belt reactor is of extremely complicated construction, not least because the belt is comparatively long and has to have a U- or V-shaped configuration. This causes high mechanical stress on the belt in operation.

It is therefore an object of the present invention to provide a process for preparing polyisobutene, especially high molecular weight polyisobutene, which overcomes the disadvantages of the prior art outlined here. In particular, the process should enable good control of the reaction and be less complicated in apparatus terms.

It has now been found that, surprisingly, these objects are achieved when the isobutene as a mixture with an inert diluent is contacted with a halogen-containing Lewis acid in the gas space of the polymerization reactor.

The present invention therefore relates to a process for preparing polyisobutene by polymerizing isobutene using an inert diluent and a halogen-containing Lewis acid as a catalyst, wherein a liquid mixture of isobutene with the inert diluent is contacted with the catalyst in the gas space of a polymerization apparatus.

The process according to the invention is carried out in a suitable polymerization apparatus which is equipped with devices for feeding the reactants and removing (or for discharging) the product, means for generating droplets and means for cooling. It is preferably a polymerization apparatus in which the reaction space has an upright or vertical arrangement, i.e. the isobutene (in the form of the liquid mixture) and, if appropriate, the catalyst is fed in the upper region of the reaction space, the height of the reaction space generally being greater than its diameter in the horizontal.

The polymerization apparatus has a gas space, i.e. it is filled with liquid only partly to a slight degree, if at all. The gas space typically takes up the predominant part of the polymerization apparatus, the polymerization apparatus being understood to mean only the actual reactor (reaction space) without the means of supplying the reactants, means of discharging the products, cooling apparatus and the like. In the process according to the invention, a liquid mixture of isobutene and the inert diluent is generally fed into the upper region of the polymerization apparatus and contacted there with the catalyst. As soon as the catalyst comes into contact with the isobutene-containing liquid, there is spontaneous polymerization of the isobutene. The heat of polymerization is removed by evaporation of the diluent. This forms polymerizing droplets. These then fall downward and can be discharged from the reactor.

The liquid mixture of isobutene and diluent is fed in (or sprayed in) typically as a liquid jet or liquid film or in the form of droplets, the droplets preferably having a diameter in the range from 1 to 1000 μm, in particular in the range from 5 to 500 μm and especially in the range from 10 to 300 μm. When the liquid mixture is fed in as a liquid jet or liquid film, there is generally disintegration of the jet or film to form droplets.

The liquid mixture is fed in with the aid of customary apparatus known to those skilled in the art, which is generally arranged in the upper region of the polymerization apparatus. For example, the apparatus may be one or more spray nozzles or atomizer disks. When a plurality of spray nozzles or atomizer disks is used, they may be arranged in the polymerization apparatus uniformly over the cross section or in a ring. In that case, they are preferably supplied with the liquid to be sprayed via a common ring line. The number of spray nozzles depends on the diameter of the spray apparatus. It is typically in the range from 1 to 100, in particular from 5 to 50 and especially from 5 to 30. The spray cones of the spray nozzles preferably overlap, such that the total volume of the reaction space can be supplied uniformly (homogeneously) with the liquid mixture of isobutene and diluent. The opening angle of the spray cone is generally in the range from 15 to 120 degrees.

The nozzles may be selected such that the liquid mixture is introduced into the gas space of the reactor in the form of a hollow cone, of a solid cone, in the form of a fan, in the form of a smooth jet or in a form which arises through superimposition of at least 2 of the afore-mentioned forms. For the purposes of feeding-in the isobutene-containing stream, it is possible to use one-substance nozzles, two-substance nozzles, three-substance nozzles or mixing nozzles (when the liquid mixture of isobutene and diluent is fed in together with the catalyst and/or cocatalyst) or arrangements of a plurality of nozzles which spray into one another for the purposes of mixing. Two-substance nozzles or three-substance nozzles are understood by the person skilled in the art to mean nozzles to which an atomizer gas is supplied for the purposes of atomization. The mixing nozzles may be externally mixing or internally mixing. The atomization can also be effected by the method of laminar jet decomposition, as described in Rev. Sci. Instr. Volume 38 (1966), p. 502-506. Preference is given to nozzles with a hollow cone characteristic.

When the liquid mixture is introduced into the reactor in the form of droplets, the diameter of the droplets can be varied by means of the diameter of the nozzle orifice or by means of the diameter of the holes in the atomizer disks. In addition, the size of the droplets is adjustable by means of the pressure with which the isobutene is supplied.

It has been found to be advantageous when the liquid mixture of isobutene and diluent, before it is fed into the reactor, is cooled to temperatures in the region of the reaction temperature. Preference is given to cooling the liquid mixture to a temperature which is not more than 20 K and especially not more than 10 K different from the reaction temperature, and temperatures below the reaction temperature are generally not critical.

For the feeding-in or spraying of the liquid mixture, a pressure which is appropriately in the range from 1 to 100 bar can be established. The rate with which the liquid mixture of isobutene and diluent is fed in is typically in the range from 1 to 100 m/sec and especially in the range from 5 to 50 m/sec.

The liquid mixture of isobutene and diluent can be contacted in different ways. The procedure will preferably be to introduce the catalyst into the reaction space in the region in which the liquid mixture of isobutene and diluent is fed in. The catalyst can be introduced into the gas space of the polymerization reactor in gaseous form or in the form of a liquid.

Preference is given to feeding the catalyst into the reactor in liquid form. Preference is given to feeding the catalyst into the reactor as a mixture with one of the aforementioned diluents. The diluent which is fed in together with the catalyst may be identical to the diluent of the isobutene-containing liquid or different therefrom. With regard to the preferences, the same statements apply as above. When the catalyst is sufficiently volatile, for example in the case of $BF_3$, it can also be introduced into the reactor in gaseous form.

Preference is given to feeding the catalyst into the reactor in liquid form by means of suitable nozzles or atomizer disks, for example by means of the aforementioned nozzles, which feed the liquid stream into the reactor as a smooth jet, solid cone or hollow cone or as a mixed form thereof. The procedure here will preferably be such that the isobutene-containing liquid streams meet the catalyst-containing liquid streams in the gas space of the reactor. For example, the procedure may be such that the nozzles are arranged in such a way that the spray jet(s) or spray cone of the isobutene-containing liquid cross(es) with the spray jet(s) of the catalyst-containing liquid.

When the catalyst is fed in liquid form, the catalyst can be fed in or sprayed by establishing a pressure which is appropriately in the range from 1 to 100 bar. The rate at which the catalyst-containing liquid is fed in is typically in the range from 5 to 200 m/sec and especially in the range from 10 to 100 m/sec.

The catalyst is preferably introduced into the upper region of the polymerization apparatus separately from the isobutene-containing stream, for example in the form of droplets which comprise inert diluent. In this case, the contacting of isobutene and catalyst can be effected by collision of the liquid streams, for example of the droplets formed in the reactor, or else actually before the droplet formation in the liquid film as it leaves.

In particular, it has been found to be useful when the catalyst or the catalyst-containing liquid is contacted immediately within the region in which the liquid mixture of isobutene and diluent is fed in. In this case, the procedure will appropriately be to feed the catalyst, preferably in liquid form, and the liquid mixture of isobutene and diluent into the reactor using a mixing nozzle. For example, a mixture of isobutene and diluent can be sprayed in an inner hollow cone by means of a mixing nozzle, and a liquid mixture of diluent and catalyst can be sprayed in an outer hollow cone which intersects the inner hollow cone. Reversed feeding-in is also possible. It has been found to be advantageous when the mixture of catalyst and diluent is fed into the reactor with a higher pressure and higher rate than the mixture of isobutene and diluent.

It has also been found to be advantageous when a veil gas is fed in the region of those points in the reactor at which the liquid mixture and/or the catalyst is fed in, in order to reduce or to prevent polymeric deposits in the region of the feed points. Useful veil gases include especially the gaseous diluents, for example ethene, ethane, propane, propene and the like. The veil gas can be fed in a customary manner, for example through one or more gaps or slots, which are preferably arranged as an annular gap around the feed points for the liquid mixture and for the catalyst.

The dimensions of the polymerization apparatus should be such that the residence time of the polymerizing droplet in the reactor (falling time or falling duration) is from about 0.1 to 100 sec., preferably from 0.2 to 20 sec. and especially from 0.5 to 5 sec. The height of the polymerization apparatus is accordingly generally in the range from about 0.05 to about 20 m, preferably from about 0.2 to about 5 m. The apparatus may consist of a plurality of sections which may have a different design. For example, it consists of two sections, in which case the upper can have a cylindrical design and the lower a conical design.

Suitable apparatus are known to those skilled in the art according to its principle, for example from U.S. Pat. No. 6,399,730. For example, the apparatus may be that which is also suitable for spray drying or spray cooling, as described, for example, in K. Masters, Spraydrying Handbook, 5th Edition, Longman, 1991, pages 23-66. Preference is given to using a spray reactor arranged vertically, especially a spray tower.

Appropriately, the isobutenic stream fed into the polymerization apparatus is precooled to a temperature which is in the region of the reaction temperature or lower.

The inert diluent should preferably be such that it evaporates owing to the heat of reaction and removes the heat of reaction in this way. The selection of the diluent is accordingly dependent upon the polymerization temperature. Preference is therefore given to diluents which have a boiling point in the region of the reaction temperature at the pressure existing in the reaction vessel (reaction pressure). Suitable diluents are, for example, saturated hydrocarbons having from 2 to 6 carbon atoms, such as propane, butane, pentane, cyclopentane and hexane, unsaturated hydrocarbons, such as ethene, propene, 1-butene and 2-butene, and halogenated hydrocarbons having 1 or 2 carbon atoms, such as methyl chloride, dichloromethane or trichloromethane, difluoromethane, chlorodifluoromethane, difluoroethane or mixtures thereof. Ethene and mixtures thereof with propane, propene, butane, isobutane, 1-butene and/or 2-butene are particularly preferred, especially mixtures with boiling points below −70° C., preferably below −90° C. and especially below −100° C. (based in each case on standard pressure). Ethene and the aforementioned mixtures of ethene are especially preferred for the preparation of high molecular weight polyisobutene.

Before they are used, isobutene and the diluents are preferably freed of impurities such as water, carboxylic acids or mineral acids, for example by adsorption on solid adsorbents such as activated carbon, molecular sieves or ion exchangers. The content of such impurities in the isobutene stream fed to the reaction is typically in each case below 100 ppm, especially in each case below 10 ppm (proportions by weight).

According to the invention, at least a portion of the diluent used in the polymerization is introduced into the polymerization apparatus as a liquid mixture with isobutene. Alternatively, it is possible to saturate the polymerization apparatus with the diluent and to introduce the isobutene-containing liquid stream into the gas space of the reactor saturated with the diluent at a temperature which is below the saturation temperature. In this way, the diluent condenses onto the isobutene-containing liquid stream fed in.

The weight ratio of diluent to isobutene in the mixture of isobutene and diluent fed in is generally in the range from 5:1 to 1:2, in particular in the range from 3:1 to 1:1, particularly preference being given to a ratio of from 2.5:1 to 1.5:1, in particular from 2.2:1 to 1.8:1, such as about 2:1.

Suitable catalysts are halogen-containing Lewis acids such as boron trifluoride, aluminum trichloride, zinc chloride, zirconium chloride, titanium tetrachloride, etc. Boron trifluoride is preferred, especially gaseous boron trifluoride.

The catalyst may frequently be used together with a suitable cocatalyst, especially in the case of use of $BF_3$ as a catalyst. The cocatalysts may firstly be compounds having an abstractable hydrogen atom. They are referred to as "starters" because their active hydrogen atom is incorporated at the start of the growing polyisobutene chain. Suitable "starters" are, for example, water, primary $C_1$-$C_{10}$-alkanols, secondary $C_3$-$C_{10}$-alkanols, phenol compounds such as phenol and cresols. Additionally suitable as starters are tert-alkyl ethers such as t-butyl methyl ether, or halohydrocarbons such as dichloromethane or trichloromethane. Also suitable are mixtures of the aforementioned starters with aliphatic ethers other than tert-alkyl ethers, especially dialkyl ethers with primary $C_2$-$C_8$-alkyl radicals and/or secondary $C_3$-$C_8$-alkyl radicals. Suitable cocatalysts are primary $C_1$-$C_5$-alkanols, secondary $C_3$-$C_5$-alkanols such as methanol, ethanol, 2-propanol, 1-propanol, 2-butanol, sec-pentanol and mixtures thereof with higher alcohols such as sec-hexanol, sec-heptanol and/or sec-octanol, or ethers such as tert-butyl methyl ether. Methanol and 2-propanol and mixtures thereof with tert-alkyl ethers such as tert-butyl methyl ether are preferred cocatalysts. When the catalyst comprises a cocatalyst, the molar ratio of Lewis acid to cocatalyst is generally in the range from 1:1 to 1:10, in particular from 1:1.1 to 1:5 and more preferably from 1:1.2 to 1:2.5.

The cocatalyst can be fed into the reactor separately or together with the Lewis acid. The majority or especially the entirety of the cocatalyst is preferably present in the liquid mixture of isobutene and diluent. However, the entirety, but preferably only a portion, of the cocatalyst can also be fed into the reactor together with the Lewis acid, if appropriate as a mixture with the diluent.

The amount of Lewis acid is generally in the range from 0.001 to 1% by weight, frequently in the range from 0.005 to 1% by weight and especially in the range from 0.005 to 0.5% by weight, based on the isobutene used. In the case of preparation of high molecular weight polyisobutene, the amount is preferably from 0.005 to 0.05% by weight based on isobutene used. However, in the case of boron trifluoride, it is also possible to use larger amounts here, for example in the range of from 0.01 to 1% by weight, in particular from 0.05 to 0.5% by weight, based on isobutene used. In the case of preparation of medium molecular weight polyisobutene, the amount is preferably from 0.01 to 0.1% by weight, in particular from 0.01 to 0.05% by weight, based on isobutene used. In the case of preparation of low molecular weight polyisobutene, the amount is preferably from 0.05 to 0.5% by weight, based on isobutene used.

In the case of preparation of high molecular weight polyisobutene using $BF_3$ as a catalyst, the catalyst may also be used in larger amounts than the amounts specified here as preferred, for example in the range from 0.01 to 1% by weight, in particular in the range from 0.05 to 0.5% by weight, based on isobutene used. In that case, the amount of cocatalyst is typically from 0.0001 to 0.1% by weight, in particular from 0.001 to 0.01% by weight, based on isobutene used, and the weight ratio of Lewis acid to cocatalyst is preferably in the range from 200:1 to 10:1.

The polymerization temperature is dependent upon the desired product and the pressure existing in the polymerization apparatus. Typically, the process is carried out at standard pressure or slightly elevated pressure, which may generally be up to 300 mbar above ambient pressure. It is likewise possible to perform the process under reduced pressure (up to about 800 mbar or up to 900 mbar absolute).

For the preparation of high molecular weight polyisobutene, the polymerization temperature is in the range from −70° C. to −110° C.; in particular, it is in the range from −90° C. to −105° C., for example at about −104° C. For the preparation of medium molecular weight polyisobutene, the polymerization temperature is generally in the range from −10° C. to −60° C. For the preparation of low molecular weight polyisobutene, the polymerization temperature is in the range from +40° C. to −50° C.

Cooling of the reactor walls is not necessarily required, but is advantageous. It has been found to be appropriate to cool the reactor walls to polymerization temperature or lower. This results in condensation of the diluent on the reactor wall, which has the advantage that any adhering isobutene or polyisobutene droplets can be flushed off.

In a first embodiment of the process according to the invention the polymerization is carried out under such pressure and temperature conditions that the atmosphere in the polymerization apparatus is saturated with the inert diluent. The diluent therefore collects in liquid form in the lower region of the polymerization apparatus and forms a liquid reservoir. In the case of high molecular weight polyisobutene, the polyisobutene droplets obtained in the polymerization are in solid form at the temperatures existing, otherwise in dissolved form, and collect in the liquid reservoir. This facilitates the discharge of the polyisobutene from the polymerization apparatus. In this way, the apparatus and especially the discharge device are prevented from becoming conglutinated by the polyisobutene which is very tacky at elevated temperature.

Both the diluent and the catalyst can be withdrawn in the lower region of the polymerization apparatus and conducted through a separator or condenser and recycled.

In a further preferred embodiment of the invention, the polymerizing droplets are sprayed onto a mechanical discharge apparatus, i.e. the liquid mixture of isobutene and diluent and the catalyst are fed into the gas space of the reactor in such a way that the reaction mixture obtained after the liquid mixture has been contacted with the catalyst, i.e. the polymerizing droplets, is sprayed onto a mechanical discharge apparatus. In this embodiment, the reactor preferably has a vertical or upright arrangement.

Suitable mechanical discharge apparatus are, for example, kneaders or extruders. Preference is given to venting the polymer in these apparatus. Preference is given especially to extruders with a cooled intake, since they allow a particularly high molecular weight polyisobutene to be obtained.

The distance of the discharge apparatus from the point(s) at which the liquid mixture is fed in is generally in the range from about 0.05 to about 20 m and preferably in the range from about 0.2 to about 5 m.

In a further preferred embodiment of the invention, the polymerizing droplets are sprayed onto a rotating apparatus or a rotating body, i.e. the liquid mixture of isobutene and diluent and the catalyst are fed into the gas space of the reactor in such a way that the reaction mixture obtained after the liquid mixture has been contacted with the catalyst, i.e. the polymerizing droplets, hits a rotating body. The reaction mixture remains at reaction temperature for a short time span, generally a few seconds, in the course of which it substantially polymerizes to completion. The resulting polymer is then scraped off the body by means of suitable apparatus. From there, it can be discharged from the reactor by means of suitable discharge apparatus, for example the abovementioned kneaders or extruders. In this embodiment, the reactor preferably has a vertical or upright arrangement.

The axis of rotation of the rotating body may run vertically or horizontally. The rotating area onto which the reaction mixture is sprayed preferably has a U- or V-shaped configuration. The polymer remains on the surface of the body for a period before it is scraped off. Preference is given to effecting the scraping-off after a rotation of the apparatus in the range from 90° to 270°. The apparatus for scraping-off the polymer (scraper) is preferably arranged tilted relative to the rotating surface of the body in the direction of the rotation direction, i.e. the angle enclosed by the scraper surface and the surface of the body (tangent in rotating direction) is between 0° and 90° and typically between 300 to 90° (angle that the surface of the scraper encloses with the surface of the rotating body, or, in the case of curved surfaces, angle that the tangent along the surface (in the intersection of the extension of the scraper surface with surface of the rotating apparatus) with the scraper surface, in each case viewed in rotation direction of the apparatus). The scraper is preferably arranged so as to form a gap with the surface of the body, the gap width being especially in the range from 1 to 10 mm. The scraper is preferably arranged below the body, such that the polymer scraped off falls downward and can be discharged there, for example by means of an extruder in which a venting of the polymer can also be undertaken.

The rotational speed is typically in the range from 0.5 to 10 rpm.

The minimum distance of the surface of the rotating body from the point(s) at which the liquid mixture is fed in, i.e. the distance between the feed point and the point of the rotating body which is closest to the feed point, is generally at least 0.01 m and is generally in the range from about 0.01 to about 10 m, preferably in the range from about 0.05 to about 2 m.

Examples of suitable configurations of the rotating body are cylinders (rollers) with a horizontal axis of rotation, disks with a vertical axis of rotation, cones with a horizontal or with a vertical axis of rotation and similar apparatus. These apparatus preferably have means of cooling the surface of the rotating apparatus. Such apparatus are known to those skilled in the art and can be purchased from GMF-Gouda Waddinxveen, the Netherlands.

Unlike in the prior art processes, especially compared to the belt process, a polymerization takes place in the process according to the invention actually in the gas space of the reactor in the droplets which form. In addition, the residence times of the reaction mixture in the reactor, owing to the better mixing achieved in accordance with the invention, of catalyst and isobutene are comparatively short. Therefore, instead of the known polymerization apparatus, for example instead of the long circulating continuous belt, a compact reactor, if appropriate with a comparatively compact fixed rotating apparatus, can be used. This arrangement causes great advantages with regard to capital costs, cleaning, maintenance, and space requirement.

Instead of a rotating apparatus or a rotating body, it is also possible to use circulating continuous belts, as known from the classical belt process for preparing high molecular weight polyisobutene. The belt may likewise have devices for cooling. The belt speed is typically in the range from 0.5 to 10 m/min. The circulating surface of the belt onto which the reaction mixture is sprayed may have a U- or V-shaped configuration, but, unlike in the conventional belt process, a planar configuration is also suitable and preferred for reasons of practicability. The polymer remains on the surface of the belt for a period before it is generally scraped off by means of suitable apparatus. With regard to the arrangement of the apparatus for scraping-off the polymer, the statements made above apply. The residence time on the belt is typically in the range from 5 to 100 sec. Since, unlike in the classical belt process in which the polymerization does not take place until on the belt, a polymerization takes place in the process according to the invention actually in the gas space of the reactor in the droplets which form, the required residence times on the belt are significantly shorter, so that the belt can be configured with a very much shorter length, which likewise causes advantages with regard to capital costs, cleaning, maintenance and space requirement. In addition, the splashing which occurs in the conventional belt process occur only to a very minor degree, if at all.

The reactors used in the process according to the invention generally also have means of removing gas streams, especially when volatile diluents such as ethene, propane, propene and the like are used. In the case of an upright arrangement of the reactor, these devices are preferably arranged in the lower region of the reactor.

The process according to the invention is preferably carried out continuously. In a continuous process, a portion of the reaction mixture formed in the polymerization reactor is discharged continuously. An amount of starting materials corresponding to the discharge is fed continuously to the polymerization reactor. In contrast to the prior art processes, the residence times in the reactor are comparatively short and the backmixing of reactive constituents is low, so that particularly uniform products are obtained by the process according to the invention. The high molecular uniformity of the products is also promoted by the very uniform removal of the heat of reaction achieved in the process according to the invention.

A preferred embodiment of the invention relates to a process for preparing high molecular weight polyisobutene which has a weight-average molar mass $M_w$ of $\geqq 50\,000$ g/mol and in particular a molar mass $M_w$ in the range from 50 000 to 5 000 000 g/mol, in particular from 100 000 to 5 000 000 g/mol. The polydispersity index $M_w/M_n$ (quotient of weight-average $M_w$ and number-average $M_n$ molecular weight) of the product is generally in the range from 2 to 20, in particular in the range from 4 to 15.

For the preparation of high molecular weight polyisobutene, isobutene is preferably polymerized with boron trifluoride as a catalyst. The diluents used are preferably ethene, or a mixture of ethene with propane, propene, butane, isobutane, 1-butene and/or 2-butene, especially mixtures with boiling points below −70° C., preferably below −90° C. and especially below −100° C. With regard to the cocatalysts the same applies as was stated above.

A further embodiment relates to the preparation of medium molecular weight polyisobutene, wherein the catalyst used is boron trifluoride and preferably one or more of the aforementioned cocatalysts. With regard to the preferred cocatalysts and the molar ratios, the same applies as was stated above. The polymerization temperature is typically in the range from −10° C. to −60° C., in particular from −10° C. to −35° C. The inert diluent used is preferably a hydrocarbon such as butane, isobutane, pentane or hexane, or a mixture thereof. It is not necessary to adjust it such that a liquid reservoir is formed in the lower region of the polymerization apparatus because medium molecular weight polyisobutene is sufficiently soluble in the diluent at the reaction temperatures and especially in the lower region of the polymerization apparatus in order to be able to be discharged without any problem.

A further embodiment is a process for preparing low molecular weight polyisobutene. It is possible to use the same inert diluents as in the preparation of medium molecular weight polyisobutene. The pressure and temperature conditions in the polymerization apparatus for the preparation of low molecular weight polyisobutene can be selected within a wide range and corresponds to those of the conventional preparation of low molecular weight polyisobutene. It is not necessary to adjust it such that a liquid reservoir is formed in the lower region of the polymerization apparatus because low molecular weight polyisobutene is sufficiently viscous at the reaction temperatures and especially in the lower region of the polymerization apparatus in order to be able to be discharged without any problem.

In order to prevent further reaction, the reactor effluent is typically subjected to a deactivation in which the catalyst is deactivated or removed by addition of suitable Lewis bases. The deactivation can be brought about, for example, by addition of a multiple molar excess of Lewis bases such as water, alcohols, acetonitrile, ammonia or aqueous solutions of mineral bases in the lower region of the polymerization apparatus, or by mixing the effluent with one of the aforementioned media in a downstream apparatus. Preference is given to using aqueous terminators which may comprise dissolved substances such as mineral bases, for example the hydroxides or carbonates of alkali metals or alkaline earth metals, ammonia or acids such as hydrochloric acid, etc. In particular, water is used. To prevent ice crystals, the water is preheated, typically to a temperature in the range from 35 to 150° C. Alternatively, at lower temperatures, termination by addition of acetonitrile is recommended. The deactivated effluent can appropriately be used to precool the feed, for example in a countercurrent heat exchanger. After the terminator has been added, the dispersed water drops are removed by passing the polymerization mixture into a phase separation vessel which is flowed through with a low flow rate. At the outlet of the phase separation vessel, the two phases are present in the form of one layer on top of the other and can be removed in a simple manner.

If the high and medium molecular weight polyisobutene is present in the form of a suspension in the inert diluent at the bottom of the polymerization apparatus, it is possible for it to be discharged in a simple manner with customary apparatus without difficulties occurring as a result of conglutination.

Finally, the process according to the invention also has the advantage that the consumption of inert diluent is reduced in comparison to the prior art.

The examples which follow and the figure illustrate the invention without restricting it.

FIG. 1 shows a schematic of an experimental arrangement for spray polymerization with a reactor A having a height h and an internal diameter d, which is equipped in the upper region with one or more spray nozzles B and whose walls are provided with heat exchanger apparatus C. Moreover, the spray reactor has a workup unit D which serves to remove the polyisobutene and, if appropriate, the diluent. The spray nozzle B is connected to an inlet 1 which feeds isobutene and a portion of the diluent and, if appropriate, cocatalyst, and two inlets 2 and 3 for feeding the diluent and the catalyst. In addition, the reactor shown in FIG. 1 has an outlet 4 for the diluent vapor. The heat exchanger C has inlets 5 and outlets 6 for the coolant. The spray reactor A may also have a plurality of temperature measuring points $T_1$, $T_2$ and $T_3$.

Figure 2:
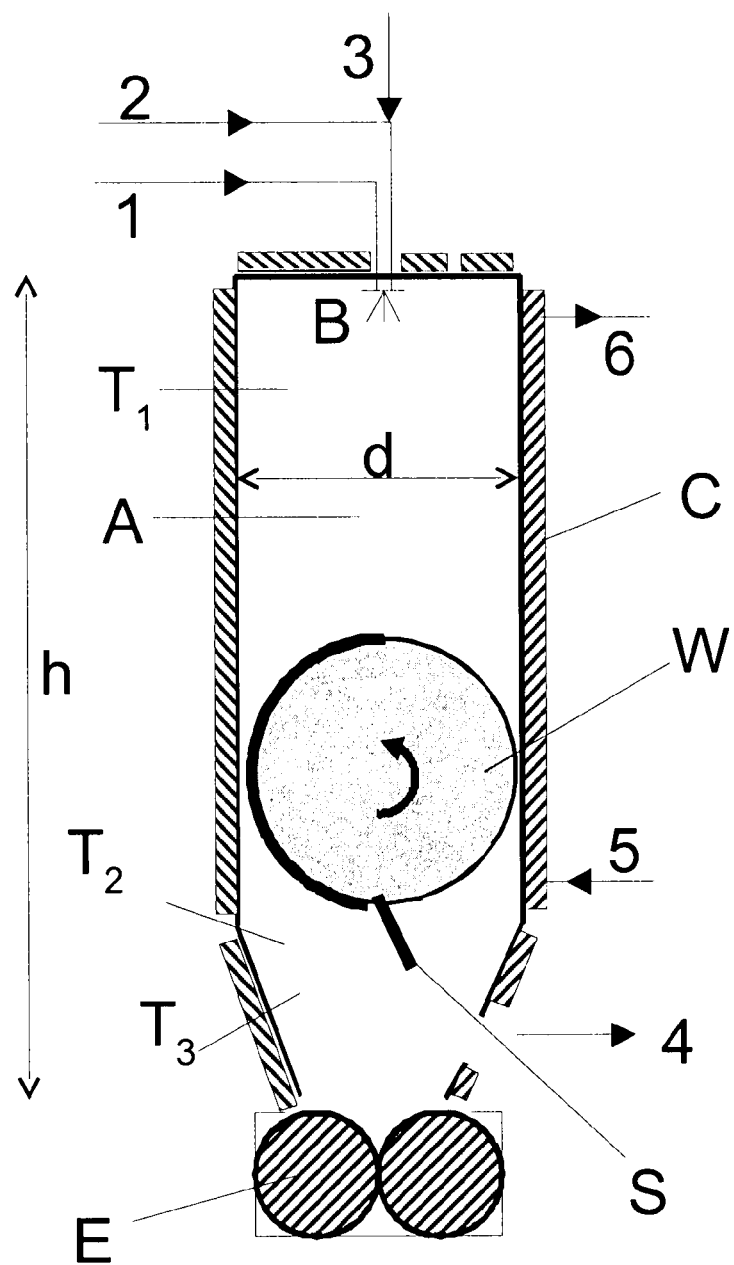

FIG. 2 shows a schematic of a longitudinal section through an experimental setup for performing the process according to the invention, comprising a spray reactor A with a height h and an internal diameter d, which is equipped with one or more spray nozzles B in the upper region and whose walls are provided with heat exchange apparatus C. Moreover, the spray reactor has, in the lower region, a rotating roller W which can be provided with means of cooling (not shown). Below the roller W is arranged a scraper S by means of which the reaction product is scraped off. Below the roller W with scraper S is arranged an extruder E into which the product scraped off from the roller W falls and is sent to a venting operation. The spray nozzle B is connected to a supply line 1 which supplies isobutene and a portion of the diluent and if appropriate cocatalyst, and two supply lines 2 and 3 for supplying the diluent and the catalyst. In addition, the reactor shown in FIG. 2 has a removal line 4 for the diluent vapor. The heat exchanger C has supply lines 5 and removal lines 6 for the coolant. The spray reactor A may also have a plurality of temperature measurement points $T_1$, $T_2$ and $T_3$.

Figure 3:
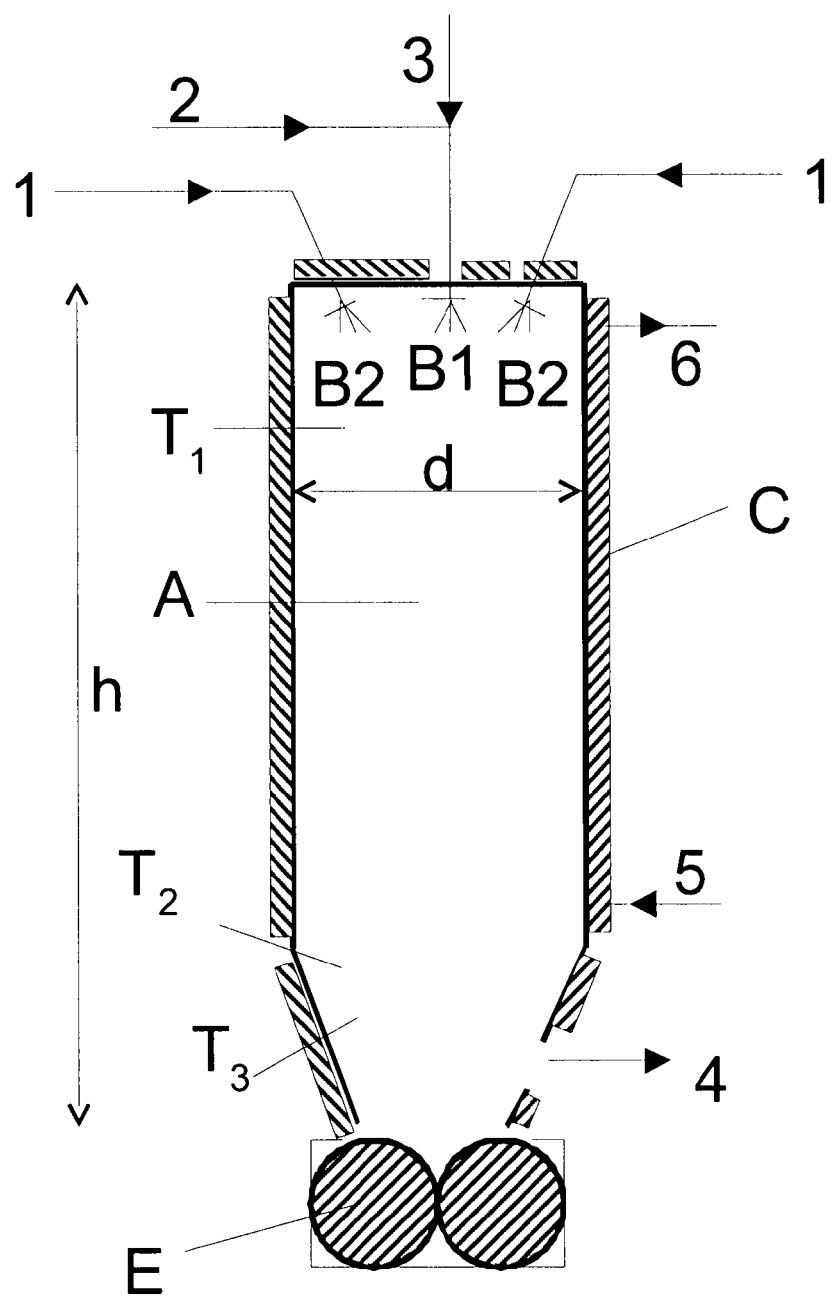

FIG. 3 shows a schematic of a longitudinal section through an experimental setup for performing the process according to the invention, comprising a spray reactor A with a height h and an internal diameter d, which is equipped in the upper region with one or more nozzles B1 arranged centrally and a plurality of, for example 5 or 6, outer nozzles B2 arranged in a ring around B1, and whose walls are equipped with heat exchange apparatus C. The spray direction of the nozzles B2 is tilted in the direction of the longitudinal axis of the reactor (tilt angle from 5 to 300 based on the longitudinal axis). Around the nozzles B1 and B2 may be arranged a annular gap (not shown) through which a veil gas can be introduced. In addition, the spray reactor has an extruder E which serves for the discharge of the polyisobutene and if appropriate of a portion of the diluent. The spray nozzles B2 are connected to a supply line 1 which supplies isobutene and a portion of the diluent and if appropriate cocatalyst, and the spray nozzles B1 to two supply lines 2 and 3 for supplying the diluent and the catalyst. In addition, the reactor shown in FIG. 3 has a removal line 4 for the diluent vapor. The heat exchanger C has supply lines 5 and removal lines 6 for the coolant. The spray reactor A may also have a plurality of temperature measurement points $T_1$, $T_2$ and $T_3$.

EXAMPLES 1 TO 3

A spray reactor, as shown schematically in FIG. 1, with a height of 12 m and an internal diameter of 2 m, which had an external mixing nozzle (from Schlick) as the spray nozzle B and a ZSK 70 contrarotatory twin-shaft venting extruder (from Coperion) as the workup unit D, was inertized with dried nitrogen. Subsequently, ethylene was introduced via inlet 2 with cooling until an ethylene pool had formed in the conical part of the reactor. Subsequently, isobutene was introduced into the reactor at a rate of 50 kg/h and isopropanol at the rate specified in table 1 via inlet 1, and ethylene at a rate of 120 kg/h and $BF_3$ at a rate of 100 g/h via inlets 2 and 3. This resulted in polymerization and polyisobutene collected in the ethylene pool in the form of a granule which was discharged via the workup unit D. The discharge was controlled via the temperature measuring points $T_2$ and $T_3$. When the temperature at $T_2$ rose to values above −104° C., the discharge rate was reduced in order to accumulate ethylene. When the temperature at $T_2$ fell to −104° C., the discharge rate was increased in order to discharge ethylene. Ethylene vapor was drawn off via the outlet 4, freed of $BF_3$, compressed and recycled into the reactor.

After an operating time of 8 h, the yield of polyisobutene was over 95% based on isobutene used at full conversion. The polyisobutene had the properties reported in table 1:

TABLE 1

| Example | Isopropanol [g/h] | $M_n$ [g/mol] | $M_w/M_n$ |
|---|---|---|---|
| 1 | 0.7 | 481 000 | 6.1 |
| 2 | 1.0 | 234 000 | 5.2 |
| 3 | 1.3 | 145 000 | 4.8 |

EXAMPLES 4 TO 6

A spray reactor, as shown schematically in FIG. 2, with a height of 2 m and an internal diameter of 1 m, which had, as the spray nozzle B, an externally mixing mixing nozzle (from Schlick) and, 60 cm below B, a horizontal roller W which rotates at 6 rpm, is cooled to −20° C. and has a diameter of 0.5 m, a scraper S arranged below the roller and a ZSK 70 contrarotatory twin-shaft venting extruder (from Coperion) arranged below it, was inertized with dried nitrogen. Subsequently, a mixture, cooled to −85° C., of 15 kg/h of isobutene, 20 kg/h of ethylene and isopropanol was introduced into the reactor via supply line 1 with cooling at the rate specified in table 2, and ethylene at a rate of 20 kg/h and $BF_3$ at a rate of 30 g/h via supply lines 2 and 3. The mixture from supply line 1 was introduced with a pressure of 5 bar and sprayed vertically downward as a hollow cone at an angle of 30°. In an outer hollow cone, the mixture of ethylene and $BF_3$ was sprayed vertically downward at an angle of 15°. As a result of the spray arrangement, the reaction mixture hit the rotating roller and the polymer formed was scraped off continuously after the roller had rotated by 180°. The material scraped off fell into the extruder E and was sent there to the venting operation.

After an operating time of 8 h, the yield of polyisobutene was over 95% based on isobutene used at full conversion. The polyisobutene had the properties reported in table 2:

TABLE 2

| Example | Isopropanol [g/h] | $M_w$ [g/mol] | $M_w/M_n$ |
|---|---|---|---|
| 4 | 6.0 | 300 000 | 6.0 |
| 5 | 4.5 | 800 000 | 6.1 |
| 6 | 3.0 | 1 500 000 | 4.2 |

EXAMPLES 7 TO 9

The reaction was effected in a spray reactor as shown schematically in FIG. 3. The spray reactor had a height of 2 m and an internal diameter of 1 m and had, in the top of the reactor, a centrally arranged free-jet nozzle B1 and 5 free-jet nozzles B2 arranged in a ring around B1 (B1-B2 distance about 25 cm), and a ZSK 70 contrarotatory twin-shaft venting extruder (from Coperion) arranged 100 cm below the nozzles. The spray direction of the outer nozzles B2 was tilted in the direction of the central reactor axis (vertical). Around nozzles B1 and B2 was in each case arranged an annular gap (not shown) with a diameter of 5 cm and a gap width of 2 mm, through which ethene was introduced as a veil gas. The reactor was inertized with dried nitrogen. Subsequently, a mixture, cooled to −85° C., of 250 kg/h of isobutene, 400 kg/h of ethylene and isopropanol was introduced into the reactor via supply line 1 with cooling at the rate specified in table 3, and ethylene at a rate of 200 kg/h and $BF_3$ at a rate of 600 g/h via supply lines 2 and 3. The mixture from supply line 1 was introduced at a pressure of 5 bar and sprayed obliquely inward via the 5 nozzles B2. Through the narrower nozzle B1, the mixture of ethylene and $BF_3$ was sprayed as a hollow cone with an angle of 15° and a pressure of 50 bar. Through the annular gaps, a total of 5 kg/h of ethene were introduced into the reactor as veil gas. The material formed in the reaction fell into the extruder and was sent there to the venting operation.

After an operating time of 8 h, the yield of polyisobutene was over 95% based on isobutene used with complete conversion. The polyisobutene had the properties reported in table 3:

TABLE 3

| Example | Isopropanol [g/h] | $M_w$ [g/mol] | $M_w/M_n$ |
|---|---|---|---|
| 7 | 100 | 300 000 | 6.5 |
| 8 | 75 | 800 000 | 6.0 |
| 9 | 50 | 1 500 000 | 5.2 |

What is claimed is:

1. A process for preparing polyisobutene by polymerizing isobutene using an inert diluent and a halogen-containing Lewis acid as a catalyst, wherein a liquid mixture of isobutene with the inert diluent is contacted with the catalyst in the gas space of a polymerization apparatus
   wherein the catalyst is fed into the gas space of the polymerization apparatus in gaseous form
   wherein the liquid mixture of isobutene and diluent and the catalyst are fed into the gas space of the reactor in such a way that the reaction mixture obtained after contacting the liquid mixture with the catalyst is sprayed onto a mechanical discharge apparatus.

2. The process according to claim 1, wherein the diluent is selected from aliphatic saturated or unsaturated $C_2$-$C_6$ hydrocarbons and halogenated $C_1$-$C_2$ hydrocarbons.

3. The process according to claim 2, wherein the diluent is selected from ethene, propene, 1-butene, 2-butene, propane, n-butane, isobutane, n-pentane and n-hexane.

4. The process according to claim 1, wherein the weight ratio of diluent to isobutene is in the range from 3:1 to 1:1.

5. The process according to claim 1, wherein the mixture of isobutene with the diluent is fed into the gas space of the reactor as a liquid jet or liquid film or in the form of droplets.

6. The process according to claim 1, wherein the mixture of isobutene with the diluent, before being fed into the reactor, is cooled to a temperature which is not more than 20 K different from the reaction temperature.

7. The process according to claim 1, wherein the polymerization apparatus has a vertical arrangement and the liquid mixture of isobutene and diluent and the catalyst are fed in the upper region of the polymerization apparatus.

8. The process according to claim 1, wherein the atmosphere in the polymerization apparatus is saturated with diluent.

9. A process for preparing polyisobutene by polymerizing isobutene using an inert diluent and a halogen-containing Lewis acid as a catalyst, wherein a liquid mixture of isobutene with the inert diluent is contacted with the catalyst in the gas space of a polymerization apparatus, wherein the liquid mixture of isobutene and diluent and the catalyst are fed into the gas space of the reactor in such a way that the reaction mixture obtained after contacting the liquid mixture with the catalyst is sprayed onto a rotating apparatus from which the polyisobutene formed is scraped off continuously.

10. The process according to claim 1, wherein the liquid mixture of isobutene and the diluent is introduced into the gas space of the polymerization apparatus by means of a spray nozzle or spray disk.

11. The process according to claim 1, wherein the contacting of the catalyst is effected immediately in the course of feeding of the liquid mixture of isobutene and the diluent into the reactor.

12. The process according to claim 11, wherein the liquid mixture of isobutene and the diluent, and the catalyst are fed in via mixing nozzles.

13. The process according to claim 1, wherein the catalyst is boron trifluoride.

14. The process according to claim 13, wherein boron trifluoride is used together with a cocatalyst.

15. The process according to claim 1 for preparing high molecular weight polyisobutene, wherein boron trifluoride is used as the catalyst and ethene or a mixture of ethene with propane, propene, butane or isobutane is used as the diluent.

16. The process according to claim 9, wherein the diluent is selected from aliphatic saturated or unsaturated $C_2$-$C_6$ hydrocarbons and halogenated $C_1$-$C_2$ hydrocarbons.

17. The process according to claim 9, wherein the diluent is selected from ethene, propene, 1-butene, 2-butene, propane, n-butane, isobutane, n-pentane and n-hexane.

18. The process according to claim 9, wherein the weight ratio of diluent to isobutene is in the range from 3:1 to 1:1.

19. The process according to claim 9, wherein the mixture of isobutene with the diluent is fed into the gas space of the reactor as a liquid jet or liquid film or in the form of droplets.

20. The process according to claim 9, wherein the mixture of isobutene with the diluent, before being fed into the reactor, is cooled to a temperature which is hot more than 20 K different from the reaction temperature.

21. The process according to claim 9 wherein the catalyst is fed into the gas space of the polymerization apparatus in liquid form.

22. The process according to claim 9, wherein the catalyst is fed into the gas space of the polymerization apparatus in gaseous form.

23. The process according to claim 9, wherein the polymerization apparatus has a vertical arrangement and the liquid mixture of isobutene and diluent and the catalyst are fed in the upper region of the polymerization apparatus.

24. The process according to claim 9, wherein the atmosphere in the polymerization apparatus is saturated with diluent.

25. The process according to claim 9, wherein the liquid mixture of isobutene and the diluent is introduced into the gas space of the polymerization apparatus by means of a spray nozzle or spray disk.

26. The process according to claim 9, wherein the contacting of the catalyst is effected immediately in the course of feeding of the liquid mixture of isobutene and the diluent into the reactor.

27. The process according to claim 26, wherein the liquid mixture of isobutene and the diluent, and the catalyst are fed in via mixing nozzles.

28. The process according to claim 9, wherein the catalyst is boron trifluoride.

29. The process according to claim 28, wherein boron trifluoride is used together with a cocatalyst.

30. The process according to claim 9 for preparing high molecular weight polyisobutene, wherein boron trifluoride is used as the catalyst and ethene or a mixture of ethene with propane, propene, butane or isobutane is used as the diluent.

* * * * *